F. RICHARDSON.
LIFTING TONGS.
APPLICATION FILED MAR. 27, 1920.

1,365,196.

Patented Jan. 11, 1921.

Witness:
R. E. Hamilton

Inventor;
Frank Richardson,
By Thorpe Gerard
Attys.

UNITED STATES PATENT OFFICE.

FRANK RICHARDSON, OF KANSAS CITY, MISSOURI.

LIFTING-TONGS.

1,365,196.  Specification of Letters Patent.  Patented Jan. 11, 1921.

Application filed March 27, 1920. Serial No. 369,409.

*To all whom it may concern:*

Be it known that I, FRANK RICHARDSON, a citizen of the United States, and resident of Kansas City, in the county of Jackson, State of Missouri, have invented a certain new and useful Improvement in Lifting-Tongs, of which the following is a complete specification.

The present invention pertains to lifting devices, and aims to provide an improved form of lifting tongs adapted to facilitate the operation of grappling and lifting ice cream cans and the like.

Accordingly, one of the objects of the invention is to provide an improved lifting tong structure of a character constructed to facilitate a more accurate application of the tongs to the article to be lifted, and to minimize the likelihood of injury to said article.

For this purpose I provide a pair of lifting tongs having a novel arrangement of grappling members, in that one of said members is forked, and provided with grapple teeth so arranged that all the teeth of both members of the tongs project toward a common center.

With the foregoing general object in view the invention will now be described by reference to the accompanying drawing showing the preferred form of embodiment of the same, after which the novel features therein will be particularly set forth and claimed.

In the drawing—

Figure 1:
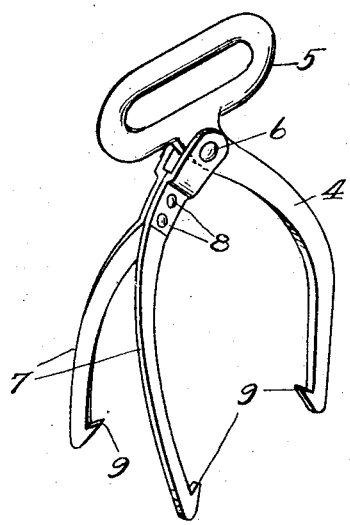
Figure 1 is a perspective view of a lifting tong construction embodying the present features of improvements.

Referring to the drawing in detail, this illustrates the improved tong construction as comprising a grapple member 4 of one-piece form and provided at its upper end with a suitable handle element 5. Pivotally connected to the member 4, as by means of a pivot pin 6 adjacent to its handle 5, is a companion grapple member composed of a pair of grapple elements 7 secured together by rivets 8 near their upper pivoted ends, which ends are spread apart sufficiently to embrace the member 4 at opposite sides thereof. The pivotal arrangement of the grapple members is such as to permit swinging movement toward and from each other from opposite directions in the usual tong fashion, and the handle 5 forms a stop for engagement with the riveted portion of the elements 7, and thus limits the spreading movement of the tongs.

Figure 2:
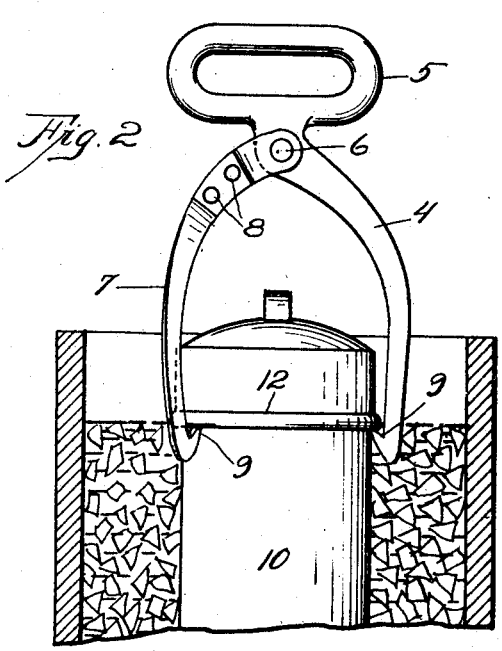
Fig. 2 is a side elevation illustrating the device in engaged relation with an ice cream can for the purpose of lifting the same from an ice compartment.
Figure 3:
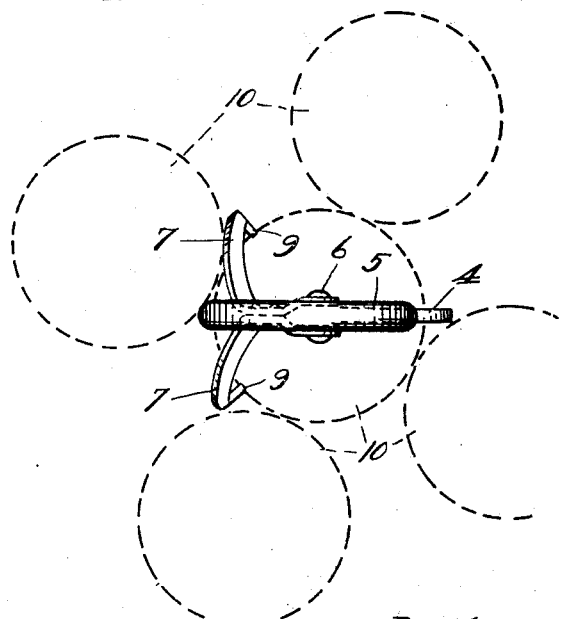
Fig. 3 is a plan view of the device, with broken lines representing a plurality of said cans, and the manner in which the device is adapted to be fitted into engaged relation with one of the cans.

The lower portion of the element 7 extends in downwardly converging fork relation, as clearly illustrated in Figs. 1 and 3, and their lower ends as well as the lower end of the member 4 are formed with tapered terminals provided with inwardly and upwardly projecting grapple hook 9. The direction in which the several teeth 9 project is such that they point approximately toward a common center, this being for the purpose of adapting said teeth to be applied in accurate radial relation to the exterior of a cylindrical article, such as a can 10, as illustrated in Figs. 2 and 3, and engagement with the bead portion 12 usually formed on cans of the type shown in Fig. 2.

In the use of the improved device, the same is manipulated by means of its handle 5 to allow the grapple element 7 to swing in pendent relation and effect engagement of their teeth 9 with the bead portion 12 of the can; with both teeth of the elements 7 so positioned, the handle 5 is swung to carry the member 4 into position for engagement of its tooth 9 with the bead 12 on the opposite side of the can, and it is obvious that this last movement will bring said tooth to a definite predetermined point on the bead 12, due to the centering action of the teeth of the elements 7 and the constant radial relation of all three teeth. This arrangement eliminates any scraping and shifting movement such as is often found necessary in fitting the grapple teeth or tongs to the can and obtaining a secure and reliable engagement therewith, and which often results in injury to the can. The operation of the improved device is also adapted to be carried out by the use of but one hand of the operator, because of the fact that the grapple teeth are practically self centering, as already explained. The tapered character of the toothed extremities of the grapple members facilitates the insertion of said toothed portions into engagement with the bead 12 of the can whenever said bead happens to be more or less embedded within the ice 13 of an ice compartment 14, as illustrated in Fig. 2. Again, where a number of cans are assembled together in closely packed relation, as represented by the broken lines in Fig. 3, which is the case when the cans are crowded close together in delivery wagons or trucks, the utility of the present tong structure becomes very apparent since the improved device may be readily applied to the can regardless of the position of the cans around it. Furthermore, the improved device embodies, in effect, a triple tong structure which distributes the lift more evenly around the can and thereby enables a greater lifting action to be exerted upon the can without injury thereto than would be possible with the usual device provided with but two grapple elements.

In practice it is preferable to make the device as small and compact as possible so as to bring the handle close to the top of the can being lifted and thus permit the operator to carry the can more easily and conveniently by reason of the fact that he can do so without bending his arm to hold the can clear of the ground.

What I claim is:

1. Lifting tongs comprising a pair of grapple members pivotally connected for swinging movement toward each other from opposite directions, one of said members being provided with a handle at its upper end and a single grapple tooth at its lower end and the other of said members being forked and each of its forked portions terminating in a grapple tooth, said teeth all projecting inwardly and upwardly toward a common center.

2. Lifting tongs comprising a pair of grapple members, one of said members being provided with a handle at its upper end and a single grapple tooth at its lower end, and the other of said members comprising a pair of grapple elements extending in downwardly converging relation and each formed with a grapple tooth, said elements being secured together near their upper ends and having said upper ends embracing opposite sides of said first member near the handle thereof, said teeth all projecting inwardly and upwardly toward a common center.

3. Lifting tongs comprising a pair of grapple members, one of said members being provided with a handle at its upper end and the other of said members being forked and pivotally connected with said first member near the handle thereof, the lower end of said first member and the forked portions of the other member being tapered and formed with grapple teeth all projecting inwardly and upwardly toward a common center.

In witness whereof I hereto affix my signature.

FRANK RICHARDSON.